United States Patent [19]

Nissen et al.

[11] 4,075,687
[45] Feb. 21, 1978

[54] MICROPROGRAM CONTROLLED DIGITAL COMPUTER

[75] Inventors: Stanley M. Nissen, Reading; Steven J. Wallach, Framingham, both of Mass.

[73] Assignee: Raytheon Company, Lexington, Mass.

[21] Appl. No.: 662,303

[22] Filed: Mar. 1, 1976

[51] Int. Cl.² .............................................. G06F 9/20
[52] U.S. Cl. ................................................... 364/200
[58] Field of Search ................... 340/172.5; 445/1; 364/200

[56] References Cited

U.S. PATENT DOCUMENTS

| | | | |
|---|---|---|---|
| 3,215,987 | 11/1965 | Terzian | 340/172.5 |
| 3,445,818 | 5/1969 | Yen | 340/172.5 |
| 3,560,933 | 2/1971 | Schwartz | 340/172.5 |
| 3,657,705 | 4/1972 | Mekota, Jr. et al. | 340/172.5 |
| 3,704,448 | 11/1972 | Osborne | 340/172.5 |
| 3,725,868 | 4/1973 | Malmer, Jr. et al. | 340/172.5 |
| 3,859,636 | 1/1975 | Cook | 340/172.5 |
| 3,900,835 | 8/1975 | Bell et al. | 340/172.5 |
| 3,930,236 | 12/1975 | Ferguson et al. | 340/172.5 |

*Primary Examiner*—Harvey E. Springborn
*Attorney, Agent, or Firm*—Richard M. Sharkansky; Joseph D. Pannone

[57] ABSTRACT

A microinstruction memory addressing control unit for a microprogram controlled digital computer is disclosed. The microinstruction memory stores an addressable fetch microprogram and independent sets of addressable microinstructions. Each one of the stored microinstructions in the sets thereof has an addressing control field. The microinstruction memory addressing control unit, in response to the microinstruction control field of a microinstruction currently under execution, is adapted to select as the next address for the memory one of a variety of addresses.

6 Claims, 3 Drawing Figures

MICROPROGRAM CONTROLLED DIGITAL COMPUTER

The invention herein described was made in the course of or under contract or subcontract thereunder, with the Department of Defense.

BACKGROUND OF THE INVENTION

This invention relates generally to digital computers and more particularly to microprogram controlled digital computers.

As is known in the art, many microprogram controlled digital computers generally include a macroprogram memory adapted to store a repertoire of macroinstructions, a microinstruction memory adapted to store sets of microinstructions, each one of the stored macroinstructions corresponding to a set of the stored microinstructions and a data flow unit including an arithmetic unit and registers to process data in accordance with the execution of selected macronistructions. The execution of a selected macroinstruction is accomplished by the execution of each one of the microinstructions in the corresponding set thereof. In the execution of each microinstruction control signals are produced and fed to the data flow unit to control the flow of data in such unit in accordance with such microinstruction. Each one of the microinstructions includes a data flow control field for controlling the flow of such data through the arithmetic unit and the registers, while also controlling the function the arithmetic unit is to perform on such data. In addition to such data flow control field, each one of such microinstructions includes a microinstruction memory address control field for selecting the address of the next microinstruction to be executed.

In a known microprogram controlled digital computer (as for example the digital computer described in U.S. Pat. No. 3,215,987, inventor J. Terzian, issued Nov. 2, 1965, and the digital computer described in copending patent application Serial No. 570,114, filed Apr. 21, 1975, entitled "Digital Processor," inventor John Terzian.) the microinstruction memory address control field selects either: (a) the address of the next sequential microinstruction in the set being executed; (b) an address designated in a JUMP field included in the microinstruction being executed (such as, for example, the address of the first microinstruction in a fetch microprogram stored in the microinstruction memory and used as a subroutine to obtain the next macroinstruction, the address of the first microinstruction in the fetch microprogram being designated by the JUMP field of the last microinstruction in the set being executed); (c) the operation code field of a fetched macroinstruction, such operation code field providing the address of the first microinstruction in the set thereof corresponding to such fetched macroinstruction; or (d) a fixed, hard-wired address, generally selected when a program interrupt signal is generated in the digital computer.

While such digital computer has been found adequate in many applications, the described microinstruction memory addressing control arrangement is limited in the degree of addressing versatility required in other applications. For example, in order to simplify the microprogramming of the digital computer it is sometimes desirable to select one of two possible microinstruction memory addresses, such address being selected in accordance with the existence or nonexistence of a selected condition (as, for example, whether the contents of a particular register are positive or not). In one known digital computer two JUMP fields are included in each one of the microinstructions, one of such two fields being selected as the address of the next microinstruction in accordance with the existence or nonexistence of the selected condition thereby requiring additional microinstruction word length and hence significantly increasing the size of the microinstruction memory. Further, in programming a digital computer of the type herein described, it is sometimes desirable to use in the execution of a set of microinstructions, a second set of microinstructions corresponding to a different macroinstruction as a subroutine. However, in the microinstruction memory address control arrangement described above, because the last microinstruction in each set thereof generally calls for the fetch microprogram which in turn calls for a macroinstruction from the macroinstruction memory, it is necessary to go through the macroinstruction memory in order to call for the desired subroutine, thereby increasing the execution time of the microinstruction set under execution.

SUMMARY OF THE INVENTION

With the foregoing background of the invention in mind, it is therefore an object of this invention to provide an improved microprogram controlled digital computer, such computer having increased microinstruction memory addressing versatility.

It is another object of this invention to provide an improved microprogram controlled computer having a microinstruction memory addressing control arrangement which enables simpler programming of such computer.

It is still a further object of this invention to provide an improved microprogram controlled digital computer including a microinstruction memory address control unit which reduces the execution time of a macroinstruction with minimum increase in the cost of such computer.

These and other objects of the invention are attained generally by providing, in a digital computer, a macroprogram memory adapted to store a repertoire of macroinstructions, a microinstruction memory adapted to store sets of microinstructions, each one of the stored macroinstructions corresponding to a set of the stored microinstructions, a data flow unit including registers and an arithmetic unit, each one of such stored microinstructions having a data flow control field for providing control of data flow through the arithmetic unit and the registers and a microinstructions memory addressing control field, a microinstruction memory address control unit, responsive to the last-mentioned field of a microinstruction under execution, for selecting the address of the next sequential microinstruction to be executed, such control unit comprising selector means for coupling a selected one of a plurality of digital words are fed thereto to the microinstruction memory to address such memory, a first one of such digital words being comprised of selected ones of a plurality of binary signals available in the computer, a second one of such digital words being selectively either the address of the fist microinstruction in a fetch microprogram or the address of the next microinstruction in a set under execution when the present microinstruction has called for, and executed, a selected microinstruction subroutine which corresponds to a different macroinstruction, a third one of such digital words being the JUMP field of the selected microinstruction, and a fourth one of such words being selectively either the address of the next sequential microinstruction in the set being executed, the digital word included in the JUMP field of the selected microinstruction displaced a predetermined number, or a digital word stored in a selected one of a plurality of storage means, and a fifth one of such digital words being the operation code field of a selected macroinstruction.

In a preferred embodiment each one of the microinstructions includes a plurality of fields. One of such fields selects the plurality of binary signals comprising the first one of such plurality of digital words. The binary signals include signals from various elements in the digital computer, including the registers, arithmetic unit and the JUMP field, or a portion thereof, of the selected microinstruction. For example, one of the digital words may include selected bits of the digital word included in the JUMP field of the selected microinstruction (i.e. XXXX) together with the carry bit Y in the arithmetic unit, and a "contents positive" bit Z of a selected reigster. Therefore, in such example the selected words appears as XXXXYZ, where YZ may be 00, 01, 10 or 11, and hence the address of the next microinstruction will be either XXXX00, XXXX01, XXXX10 or XXXX11, depending on the condition of the arithmetic unit and the selected register.

The first one of such plurality of microinstruction fields together with a second field selects as the second one of the digital words either the address of the first address of the fetch microprogram or the address of the next microinstruction in a set under execution when the present microinstruction has called for and executed a set of microinstructions which corresponds to a different macroinstruction. With sucn arrangement when a selected microinstruction indicates that a subroutine is to be called, one bit of such selected microinstruction enables a register to store the address of such selected microinstruction incremented by one (i.e. the next sequential microinstruction). Therefore, instead of the last microinstruction in the subroutine calling for the first address of the fetch microprogram, the address stored in the register will provide the address for the microinstructon memory, such address being, as discussed, the next sequential microinstruction, thereby returning to the original microinstruction set without going through the macroprogram memory.

A third one of the plurality of fields in each one of the microinstructions together with the second one of such fields selects as the next address either the JUMP field of a selected microinstruction or such JUMP field displaced by a predetermined number, depending on the existence of nonexistence of a selected condition within the computer. With such arrangement a microinstruction enables the next address for the microinstruction memory to be the address specified in the JUMP field of the selected microinstruction or such address incremented, say +1, depending on the existence or nonexistence of the specified condition. Therefore, alternative addresses may be called for; however, the microinstruction requires a word length sufficient for only one of the two possible addresses.

BRIEF DESCRIPTION OF THE DRAWINGS

The foregoing features of this invention, as well as the invention itself, may be more fully understood from the following detailed description read together with the accompanying drawings in which.

DESCRIPTION OF THE PREFERRED EMBODIMENTS

Figure 1:
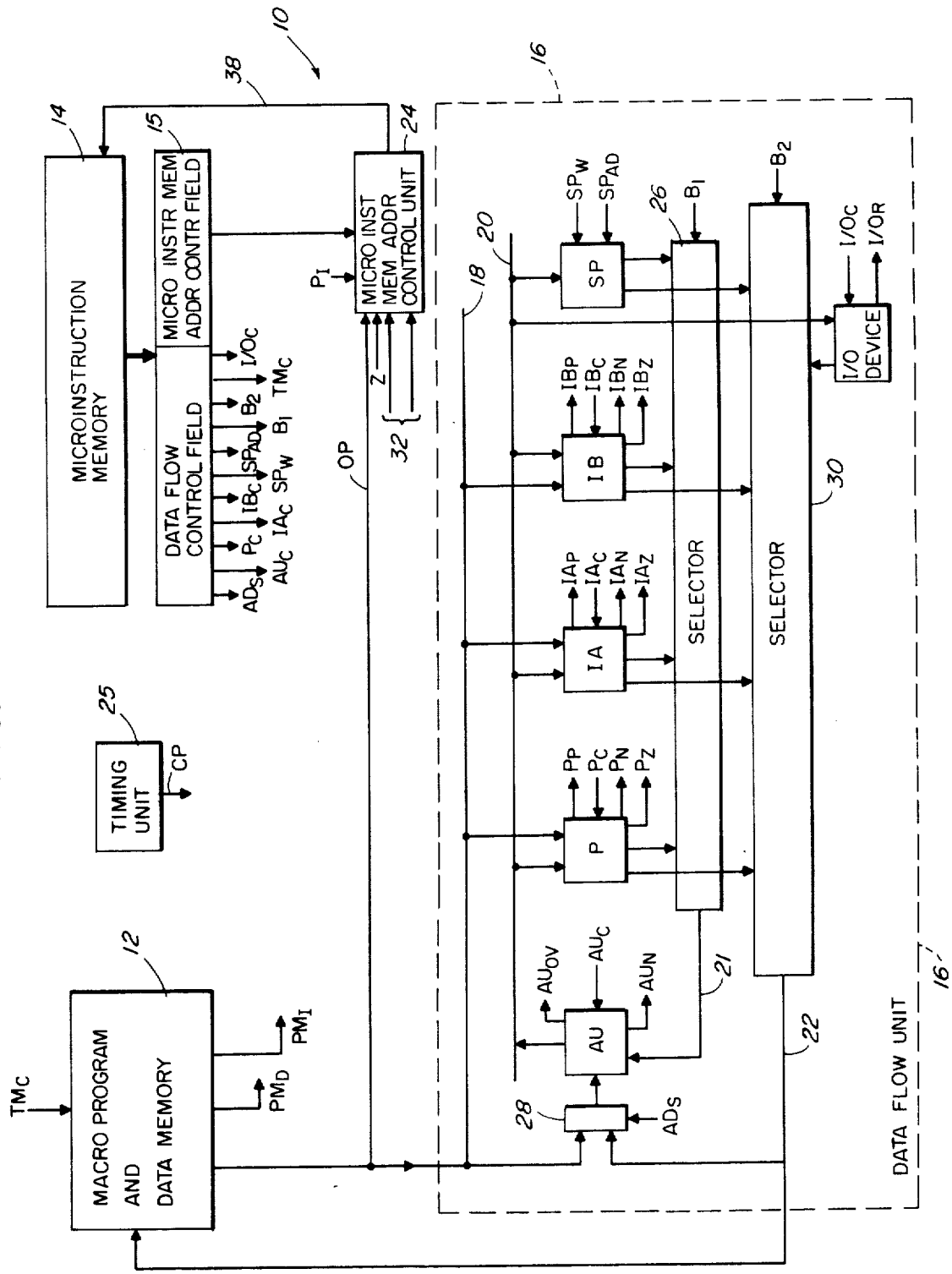
FIG. 1 is a block diagram, greatly simplified, illustrating the organization of a microprogram controlled digital computer using a microinstruction memory address control unit according to the invention.
Figure 2:
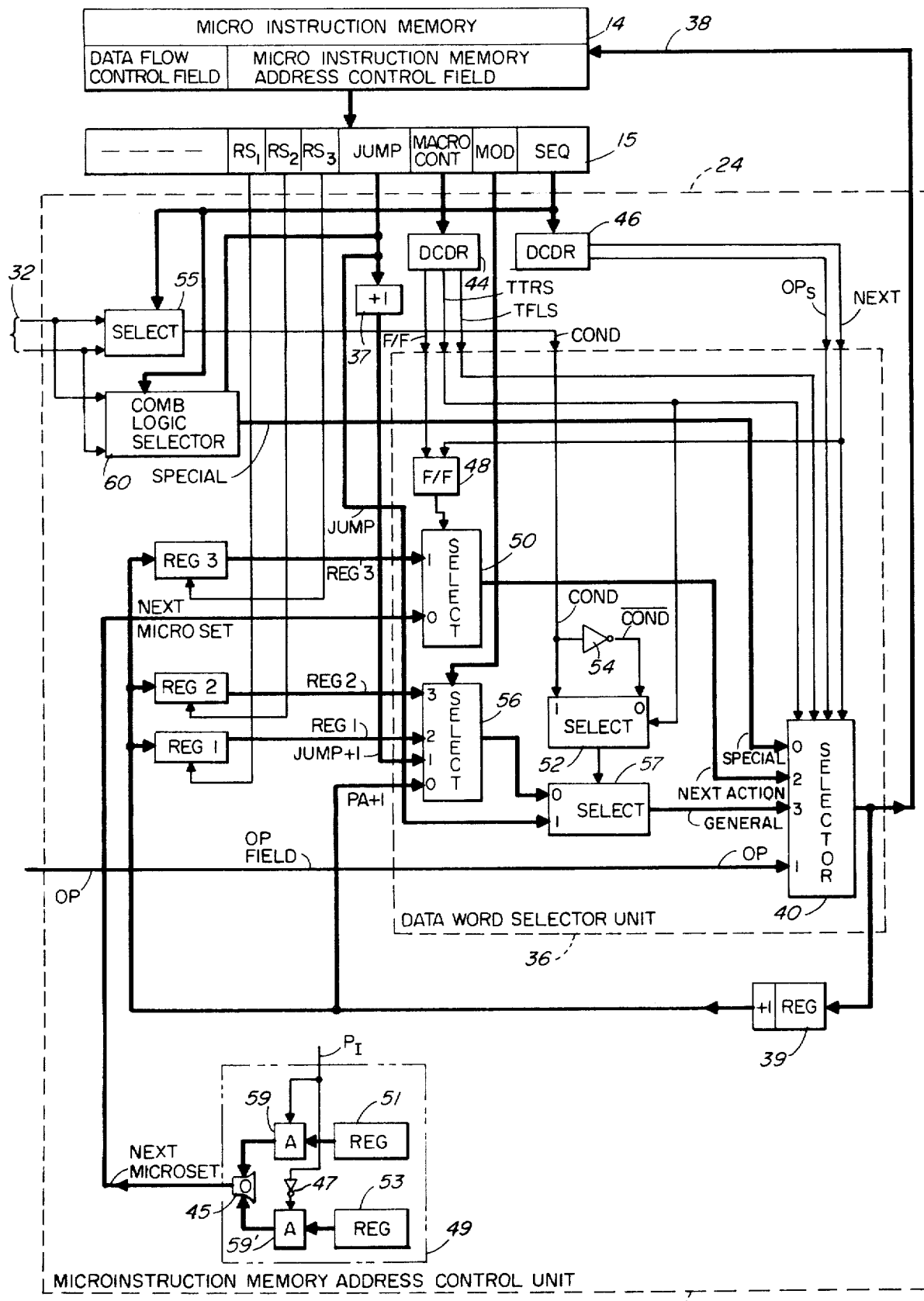
FIG. 2 is a block diagram of the microinstruction memory address control unit.

Referring now to FIG. 1, a microprogram controlled digital computer 10 is shown to include a macroprogram and data memory 12, here any conventional random access memory adapted to store a repertoire of macroinstructions, a microinstruction memory 14, here a conventional read-only memory (ROM) adapted to store sets of microinstructions, each one of such stored macroinstructions corresponding to a set of the stored microinstructions, a register 15 for storing a selected one of such microinstructions, such selected one being the microinstruction under execution by the digital computer 10, a data flow unit 16, here including two input buses, 18, 20, two output buses, 21, 22, a plurality of registers, P, IA and IB, a scratchpad random access memory, SP, an input/output device I/O and an arithmetic unit AU, all of conventional design, a microinstruction memory address control unit 24, the details of which will be described in connection with FIG. 2 and a conventional timing unit 25. Suffice it to say here that the execution of each one of the macroinstructions is accomplished by the execution of each one of the microinstructions in the corresponding set thereof, such execution providing control signals to the data flow unit 16 thereby to control the flow of data in such unit 16 in accordance with each one of such microinstructions. Each one of the microinstructions includes a data flow control field for controlling the flow of data through the arithmetic unit, AU, the registers P, IA and IB, the scratchpad memory SP via the input buses 18, 20 and the output buses 21, 22, while also controlling the function the arithmetic unit AU is to perform on selected data. In addition to such data flow control field each one of such microinstructions includes a microinstruction memory address control field which is fed to the microinstruction memory address control unit 24 for selecting the address of the next microinstruction to be read from the microinstruction memory 14.

Referring first to the function of the data flow control field it is first noted that such field provides binary signals on buses $AD_c$, $AU_c$, $P_c$, $IA_c$, $IB_c$, $SP_w$, $SP_{AD}$, $B_1$, $B_2$, $TM_c$ and $I/O_c$. It is noted that while each one of such buses is indicated as a single line, such buses are adapted to carry a plurality of bits. For example, here buses $P_c$, $IA_c$ carry three bit signals to the registers P and IA respectively and bus $IB_c$ carries a three bit signal to the register IB. The signals provided to the registers P, IB and IA control the function of such registers. It should first be noted that the P register here serves as a program counter and the IA and IB registers are here general purpose registers. In response to the three bit signal supplied to the register P and the register IA, such registers respectively either accept and store data on the bus 18; accept and store data on the but 20; accept, shift right and store data on the bus 18; accept, shift right and store the data on bus 20; maintain its present state; or increment the data stored in such register. In response to the three bit signal supplied to register IB, such register either accepts and stores data from the bus 18; accepts and stores data from bus 20; accepts, shifts right and stores the data on bus 18; accepts, shifts right and stores the data on bus 20; shifts stored data to the right; stores logical 0; maintains its present state; or shifts stored data left. The bus $AU_c$ couples eight bits to the arithmetic unit AU thereby to select the arithmetic or logic function to be applied to the two data words supplied to such arithmetic unit AU. One of such data words is coupled to the arithmetic unit AU via output bus 21 from a selector 26. Such selector 26, in response to a binary word on bus $B_1$, selectively couples to output bus 21 either a word stored in the register P, a word stored in the register IA, a word stored in the register IB, or a word stored in the scratch pad memory SP, such stored word being at a location specified by the data on bus $SP_{AD}$. The other one of the data words coupled to the arithmetic unit AU is supplied via selector 28 from either the macroprogram and data memory 12 or bus 22 selectively in accordance with a signal on bus $AD_r$. A selector 30, in response to a binary word on bus $B_2$, selectively couples to output bus 22 either a word stored in the register P, a word in the I/O device, a word stored in register IA, a word stored in register IB, or a word stored in the scratch pad memory SP, such word being at a location specified by the data on bus $SP_{AD}$. Further, the I/O device accepts data from input bus 20 in response to the data bus $I/O_c$. Considering the remaining buses: The data on bus $SP_w$ places the scratch pad memory SP in the write mode and enables data on input bus 20 to be stored in such scratch pad memory at the location specified by the data on bus $SP_{AD}$; and, the data on bus $TM_c$ places the macroprogram and data memory 12 in either the read or write mode, the address location of such memory 12 being supplied on output bus 22.

In summary, then, the data flow control field controls the flow of data on the output bus 21 and on either the output bus 22 or input bus 18 to input bus 20 after operation on such data by the arithmetic unit AU, such operation being in accordance with the word on bus $AU_c$. That is, the data flow control field defines the sources of data, the arithmetic or logic process to be performed on such sources of data and the destination of the processed data.

Referring now to the microinstruction memory address control field, it is first noted that such field is coupled to the microinstruction memory address control unit 24. Also coupled to such control circuit 24 is the operation code of a selected macroinstruction, here via bus OP, and, additionally, a plurality of condition state lines collectively numbered 32. The condition state lines include:

| line | condition |
|---|---|
| $I/O_R$ | input/output device "ready" |
| $PM_D$ | direct addressing |
| $PM_I$ | indirect addressing |
| $AU_{OV}$ | arithmetic unit AU overflow |
| $P_P$ | contents of register P are positive |
| $P_N$ | contents of register P are negative |
| $P_Z$ | contents of register P are zero |
| $IA_P$ | contents of register IA positive |
| $IA_N$ | contents of register IA negative |
| $IA_Z$ | contents of register IA zero |
| Z | hardwired to logical zero |
| $IB_P$ | contents of register IB positive |

-continued

| line | condition |
|---|---|
| $IB_N$ | contents of register IB negative |
| $IB_Z$ | contents of register IB zero |
| $AU_N$ | arithmetic unit AU is negative |

It should be noted that the above list is merely representative of the condition state lines available in the digital computer.

Referring now also to FIG. 2, the details of the microinstruction memory address control unit 24 are shown to include a data word selector unit 36. As will be described, in response to the microinstruction memory address control field of a selected microinstruction, such selected microinstruction being the one stored in register 15, a selected one of a plurality, here nine, digital words provides the address for the next selected one of the microinstructions stored in the microinstruction memory 14. Such address, here a 10 bit word, is coupled to such memory 14 via bus 38. (In this regard it is noted that the timing of the digital computer may include any conventional arrangement. Here the trailing edge of each clock pulse cp from the timing unit 25 (FIG. 1) executes the microinstruction currently resident in register 15 and simultaneously strobes the next addressed microinstruction from the microinstruction memory 14 into the register 15.) Here the nine digital words selectively coupled through the data word selector 36 via buses SPECIAL, JUMP, REG 1, REG 2, REG 3, JUMP +1, PA+1, OP FIELD, NEXT MICRO SET, respectively, are:

| DATA WORD ON BUS | DESCRIPTION |
|---|---|
| SPECIAL | A data word comprised of selected ones of the plurality of binary signals available in the digital computer 10 including: a portion of the selected microinstruction hereinafter referred to as the JUMP field; and the condition state lines 32. |
| JUMP | The word in the JUMP field |
| REG. 1 | Contents stored in Register 1 (REG. 1) |
| REG. 2 | Contents stored in Register 2 (REG. 2) |
| REG. 3 | Contents stored in Register 3 (REG. 3) |
| JUMP + 1 | The word in the JUMP field incremented by adder 37, here by + 1 |
| PA + 1 | The address of the microinstruction presently resident in register 15 incremented by register-adder 39, here by + 1 |
| OP FIELD | The operation field of the macroinstruction addressed in the macroinstruction memory 12. (This field provides the address of the first microinstruction in the set which corresponds to the addressed macroinstruction.) |
| NEXT MICRO SET | The address of the first microinstruction in a fetch microprogram stored in the microinstruction memory 14, such microprogram being used to call the next macroinstruction or a fixed address when a program interrupt signal $P_I$ is produced by the computer in any conventional manner. |

Considering now in more detail the various fields comprising the microinstruction memory address control field, it is noted that such fields are designated as follows:

| FIELD | DESCRIPTION |
|---|---|
| $RS_1$ | A 1 bit word used to set REG. 1 |
| $RS_2$ | A 2 bit word used to set REG. 2 |
| $RS_3$ | A 3 bit word used to set REG. 3 |
| JUMP | Here a 10 bit word which, as will be |

-continued

| FIELD | DESCRIPTION |
|---|---|
| | described, may serve, either totally, or in part, or incremented, here by + 1, as the next address for the microinstruction memory 14 |
| MOD | Here a 2 bit word used to select as the next microinstruction memory 14 address either the JUMP + 1, REG. 1, REG. 2 or PA + 1, in a manner to be described |
| SEQ | Used to: (a) select the plurality of binary signals available in the digital computer in forming the SPECIAL digital word; (b) to select as the next address of the microinstruction memory 14 either the OP FIELD digital word or either (1) the REG. 3 digital word or (2) the NEXT MICROSET digital word, selectively in a manner to be described; and (c) to select one of a plurality of condition state lines 32 |
| MACRO CONTROL | Used in connection with SEQ and MOD fields to (a) select either the REG. 3 digital word or the NEXT MICROSET digital word in a manner to be described in connection with the use of microinstruction sets as subroutines; or (b) to select the next microinstruction memory 14 address in accordance with the condition of one of the plurality of condition state lines 32, the one of condition state lines 32 being selected by the SEQ field |

As shown in FIG. 2, the data word selector unit 36 includes an output selector 40, here having four input buses, SPECIAL, NEXT ACTION, GENERAL and the OP BUS, and a single output, i.e. bus 38, such output providing the address of the next microinstruction in the microinstruction memory 14. One of such four buses is coupled to the bus 38 in response to control signals supplied to output selector 40 via lines TFLS, TTRS, $OP_s$ and NEXT. The lines TFLS and TTRS are coupled to the MACRO CONTROL field of the microinstruction currently resident in the register 15 via a decoder 44 and the lines $OP_s$ and NEXT are coupled to the SEQ field of such currently resident microinstruction via decoder 46. Decoder 44 is also adapted to produce a logical 1 signal on line $F/F_s$ in response to a particular binary word in the MACRO CONTROL field of the currently resident microinstruction. Line $F/F_s$ is fed to a flip/flop (F/F) 48. Such flip/flop 48 here is driven into a set condition when the signal on line $F/F_s$ is here logical 1 and such flip/flop 48 is reset in response to a logical 1 on line NEXT. Such flip/flop 48 is used in connection with microinstruction subroutines, (i.e. when a selected microinstruction subroutine which corresponds to a different macroinstruction is called) briefly described above and to be described in further detail hereinafter. Suffice it to say here that when flip/flop 48 is driven into a set condition, the output thereon becomes a logical 1 and REG. 3 couples to the NEXT ACTION bus via selector 50 and when the flip/flop 48 is reset the output thereof becomes logical 0 and the NEXT MICRO SET bus couples to the NEXT ACTION bus via such selector 50. It should be noted in passing that the NEXT MICRO SET bus is coupled to a FETCH/INTERRUPT register means 49. Such register means 49 here includes a pair of registers 51, 53, the outputs thereof being coupled to the NEXT MICROSET bus via a common OR gate means 45 and separate AND gate means 59, 59'. In response to a logical 1 on line $P_I$ register 51 is coupled to such NEXT MICROSET bus, such register 51 having stored a fixed address to be used when a program interrupt signal is produced in the digital computer. When line $P_I$ is logical 0 register 53 (which stores the address of the first microinstruction in the fetch microprogram) becomes coupled to such NEXT MICROSET bus because of inverter 47.

Line TTRS is also coupled to a selector 52. Also coupled to selector 52 is a COND line, both directly and through an inverter 54 (i.e. $\overline{COND}$ line). The COND line is the output of a selector 55. Fed to selector 55 is a plurality of condition state lines 32, described above, and the SEQ field of the microinstruction currently resident in register 15. The SEQ field selectively couples one of such condition state lines 32 to the COND line. The relationship between the binary signals on lines COND and TTRS and the output of selector 52 may be represented as follows:

| LINE | | | SELECTOR 52 |
|---|---|---|---|
| COND | TTRS | OUTPUTS | COMMENTS |
| 1 | 1 | 1 | If the selected condition state is "true", the output of selector 52 is logical 1 |
| 1 | 0 | 0 | If the selected condition state is not "false", the output of selector 52 is logical 0 |
| 0 | 0 | 1 | If the selected condition state is "false", the output of selector 52 is logical 1 |
| 0 | 1 | 0 | If the selected condition state is "not ture", the output of selector 52 is logical 0 |

The output of selector 52 is fed to a selector 57. When the output of selector 52 is logical 1 the JUMP field of the microinstruction currently resident in register 15 passes through selector 57 to the GENERAL bus; however, if the output of selector 52 is logical 0 the output of the selector 56 passes through selector 57 to such GENERAL bus. Selector 56 couples one of four digital words on buses, REG. 1, REG. 2, JUMP +1, PA+1 respectively, to the output thereof selectively in accordance with the MOD field of the microinstruction currently resident in register 15. The relationship between such digital words and the MOD field may be represented as

| MOD FIELD | SELECTOR 56 OUTPUT |
|---|---|
| 00 | PA + 1 |
| 01 | JUMP + 1 |
| 10 | REG. 1 |
| 11 | REG. 2 |

It is here noted that registers REG. 1, REG. 2, REG. 3 are coupled to the output of register-adder 39. Such registers REG. 1, REG. 2, REG. 3 store the PA+1 digital word in response to 1 bit signals in the fields $RS_1$, $RS_2$, $RS_3$, respectively of the microinstruction currently resident in register 15 for reasons to be discussed in connection with microinstruction subroutine application.

Figure 3:
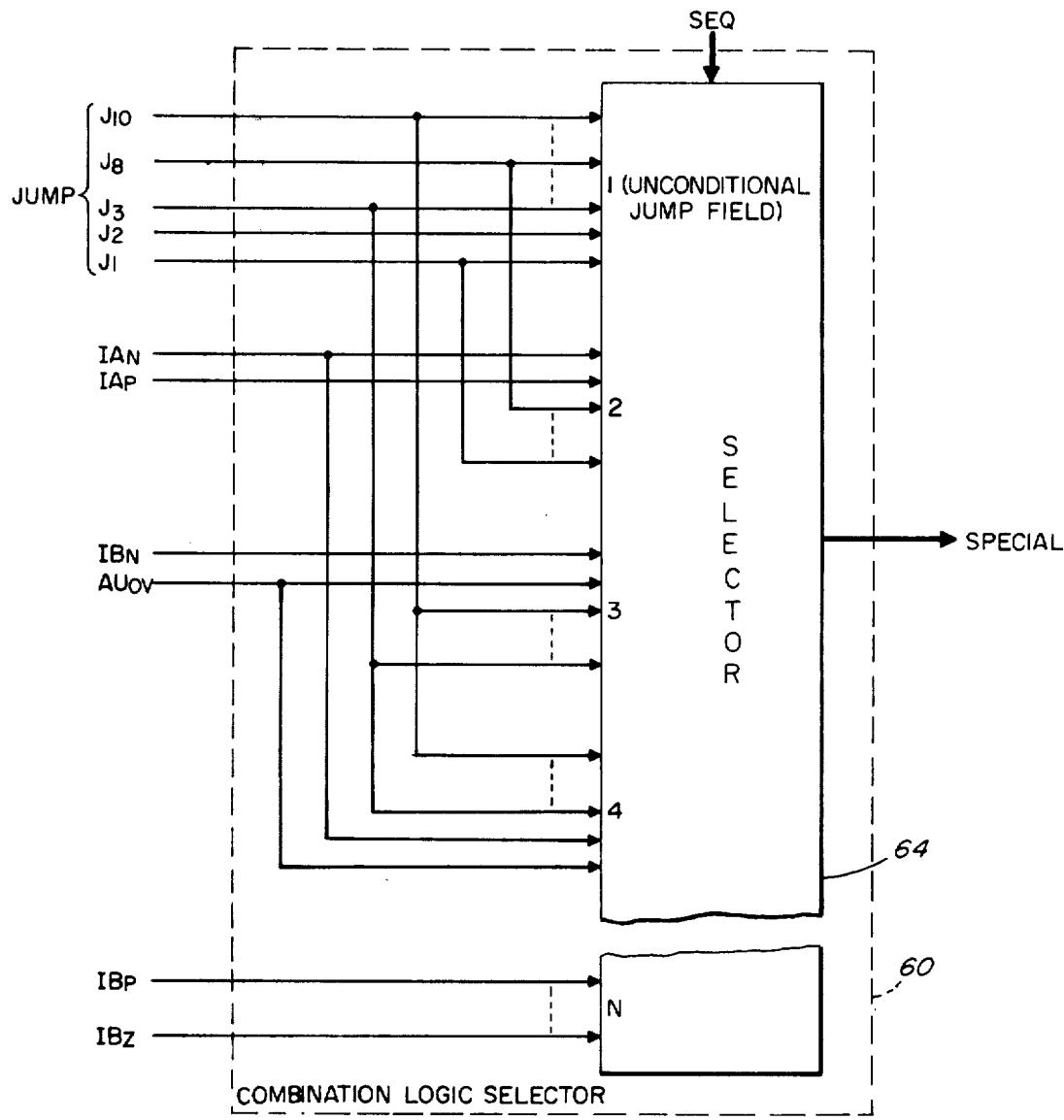
FIG. 3 is a block diagram of combinational logic selector used in the microinstruction memory address control unit of FIG. 2.

Completing the microinstruction memory address control unit 24 it is noted that the SPECIAL bus is fed by a combinational logic selector 60. As shown in FIG. 3, such combination logic selector 60 includes a selector 64 having N input ports and an output coupled to the SPECIAL bus, one of such N input ports being coupled to the output selectively in accordance with the SEQ field of the microinstruction currently resident in register 15 (FIG. 2). Each one of such N input ports is coupled to ten lines, each one of such lines carrying a binary signal. One of such input ports, here indicated by the numeral 1, is coupled to all 10 bits of the JUMP field of the microinstruction currently resident in the register 15 (FIG. 2). When the SEQ field is coded "unconditional", the JUMP field of such resident microinstruction is coupled to the SPECIAL bus. The other ones of the N input ports of selector 64 are coupled to selected bits of the resident microinstruction JUMP field and selected ones of the state lines 32. For example, the exemplary input port indicated by the numeral 2 here includes a first 8 bits of such JUMP field ($J_1 \ldots J_8$) plus the lines $IA_P$ and $IA_N$ to form a 10 bit digital word $J_1 \ldots J_8 IA_P IA_N$. Exemplary input port "3" here has the line $IB_N$, the line $AU_{OV}$ and the last 8 bits of the JUMP field ($J_3 \ldots J_{10}$) to form a 10 bit digital word $J_3 \ldots J_{10} AU_{OV}, IB_N$. The input port "N" here is a 10 bit digital word which includes ten available condition state lines, lines $IB_P$ and $IB_Z$ being shown. It follows, then, by way of example, that if the SEQ field of the microinstruction currently resident in register 15 (FIG. 2) selects the input port 4, the digital word on the SPECIAL bus will be $AU_{OV}, IA_N, J_3 \ldots J_{10}$ and such word will have four possible binary states for its two most significant bits, $AU_{OV}$ and $IA_N$. That is, such exemplary digital word may have one of the following forms:

| Data Word | Condition |
|---|---|
| 11 $J_3 J_{10}$ | Arithmetic unit (AU) is in overflow condition and contents of IA register are negative |
| 10 $J_3 J_{10}$ | Arithmetic unit (AU) is in overflow condition and contents of the register $IA_N$ are not negative |
| 01 $J_3 J_{10}$ | Arithmetic unit (AU) is not in an overflow condition and the contents of the register IA are negative |
| 00 $J_3 J_{10}$ | Arithmetic unit (AU) is not in an overflow condition and the contents of the register IA are not negative |

Referring again to output selector 40 (FIG. 2), one of the four buses fed thereto (i.e. SPECIAL bus, NEXT ACTION bus, GENERAL bus and OP bus) is coupled to bus 38 selectively in accordance with the binary signals on lines TTLS, TFLS, $OP_s$ and NEXT, as follows:

| Line | | | | Output |
|---|---|---|---|---|
| TTLS | TFLS | $OP_s$ | NEXT | On Bus 38 |
| 1 | 0 | X | X | GENERAL |
| 0 | 1 | X | X | GENERAL |

-continued

| Line | | | | Output |
|---|---|---|---|---|
| TTLS | TFLS | $OP_s$ | NEXT | On Bus 38 |
| 0 | 0 | 0 | 0 | SPECIAL |
| 0 | 0 | 1 | 0 | OP |
| 0 | 0 | 0 | 1 | NEXT |

X = Don't Care

In view of the foregoing description, the operation of the data word selector unit 36 may be summarized by the following TABLE I:

TABLE I

Control Line to Data Word Selector Unit 36

| RETURN FF | TTRS | TFLS | NEXT | OP | MOD | COND | Data Word on Bus 38 |
|---|---|---|---|---|---|---|---|
| X | 1 | 0 | X | X | 0 | 0 | PA + 1 |
| X | 1 | 0 | X | X | 1 | 0 | JUMP + 1 |
| X | 1 | 0 | X | X | $(2)_{10}$ | 0 | REG. 1 |
| X | 1 | 0 | X | X | $(3)_{10}$ | 0 | REG. 2 |
| X | 1 | 0 | X | X | X | 1 | JUMP |
| X | 0 | 1 | X | X | 0 | 1 | PA + 1 |
| X | 0 | 1 | X | X | 1 | 1 | JUMP + 1 |
| X | 0 | 1 | X | X | $(2)_{10}$ | 1 | REG. 1 |
| X | 0 | 1 | X | X | $(3)_{10}$ | 1 | REG. 2 |
| X | 0 | 1 | X | X | X | 0 | JUMP |
| X | 0 | 0 | 0 | 0 | X | X | SPECIAL |
| X | 0 | 0 | 0 | 1 | X | X | OP |
| 0 | 0 | 0 | 1 | 0 | X | X | NEXT MICRO SET |
| 1 | 0 | 0 | 1 | 0 | X | X | REG. 3 |

X = Don't Care

EXAMPLES

Having described the digital computer 10 and the constituents thereof it may be helpful in understanding the operation of such computer and particularly the operation of the microinstruction address control unit 24 to consider various examples.

EXAMPLE I

The first example will illustrate how, in the execution of a set of microinstructions, one of such microinstructions in the set thereof may call for a second set of microinstructions or subroutine from the microinstruction memory 14, such subroutine corresponding to a different macroinstruction without having to go to the macroprogram memory 12 via a fetch microprogram. As was pointed out, the microinstruction memory 14 is adapted to store a plurality of sets of microinstructions, each one of the stored macroinstructions corresponding to a set of the stored microinstructions. The last microinstruction in each one of the sets calls for the fetch microprogram. The fetch microprogram includes a set of microinstructions stored in the microinstruction memory 14 and used for the specific purpose of obtaining the next macroinstruction. The use of a fetch microprogram is well known and will not be discussed in detail except to recall that when such fetch microprogram is completed the operation code of a selected macroinstruction is transferred through the microinstruction memory address control unit via the OP bus and the bus 38 (FIG. 1) to the microinstruction memory 14. Referring to TABLE I and FIG. 2 one microinstruction in the fetch microprogram will in accordance with its SEQ field of such microinstruction place a logical 1 on the OP line and thereby couple the operation code of a macroinstruction (addressed by the register PC (FIG. 1)) through the output selector 40 to address the first microinstruction in the set corresponding to such operation code. However, as noted above and for reasons now to be discussed, when a microinstruction in a set under execution hereinafter referred to as the "basic" routine calls for a selected set of microinstructions which correspond to a different macroinstruction to serve as a subroutine in the basic routine, the last microinstruction in such subroutine will not call for the fetch microprogram but rather will return the microinstruction memory 14 to the next sequential address in the basic routine. For example, let us consider that the microinstruction presently resident in register 15 (FIG. 2) is the microinstruction at location $(200)_{10}$, such microinstruction (neglecting here the data flow field) being:

| | | Microinstruction Memory Address Control Field | | | |
|---|---|---|---|---|---|
| Location | $RS_1$ | $RS_2$ | $RS_3$ | JUMP | MACRO CONTROL | SEQ |
| $(200)_{10}$ | | | 1 | $(400)_{10}$ | $F/F_s$ | Uncon. Transfer |

In response to such microinstruction, (1) register REG. 3 stores location $(201)_{10}$; the JUMP field passes through the combination logic section 60 and output selector 40 to bus 38, thereby to provide the address of the next microinstruction (i.e. location $(400)_{10}$); and (2) flip/flop 48 is driven into the set condition. Location $(400)_{10}$ is the first instruction in a set of microinstructions representing the desired subroutine, such subroutine corresponding to a different macroinstruction. Such microinstructions in such subroutine are here represented as:

| | Microinstruction Memory Address Control Field | | | | |
|---|---|---|---|---|---|
| Location | $RS_1$ | $RS_2$ | $RS_3$ | JUMP | MACRO CONTROL | SEQ |
| $(400)_{10}$ | | | | | | |
| — | | | | | | |
| $(409)_{10}$ | | | | | NOOP | NEXT |

When the subroutine sequences to the microinstruction at location $(409)_{10}$, it is noted that if the flip/flop 48 were not in the set condition, for reasons as described above, such microinstruction causes, in the absence of a program interrupt signal on line $P_I$, the first address of the fetch microprogram to pass through selector 50 and output selector 40 to bus 38 since: (a) the MACRO CONTROL indicate "NOOP" (i.e. no operation: lines TFLS, $F/F_s$ and TTRS become all logical 0); and (b) line NEXT becomes logical 1. Here, however, flip/flop 48 has been driven into the set condition by the microinstruction at location $(200)_{10}$ and hence the contents of register REG. 3 (i.e. $(201)_{10}$) passes through selector 50 and output selector 40 to bus 38 to provide as the next address location $(201)_{10}$ thereby returning to the basic routine. It is also noted that when line NEXT produces a logical 1 in response to the microinstruction at location $(409)_{10}$, flip/flop 48 becomes reset and that when the basic routine calls for the NEXT line, the fetch microprogram is executed.

EXAMPLE II

In this example the microinstruction under execution, here at location $(100)_{10}$, states that if the arithmetic unit AU in adding two inputs (defined by the data flow control field) produces a negative result, the next microinstruction to be addressed is at location $(300)_{10}$, but if the arithmetic unit AU produces a positive result the next microinstruction address is at location $(301)_{10}$. That is, the microinstruction memory will "jump" to one of two different locations depending on the state of an element in the computer, here the result produced by the arithmetic unit AU; however, it should be noted that the microinstructions have lengths (i.e. 10 bits) sufficient to specifically define only one of the locations. The microinstruction at location $(100)_{10}$ may be represented (considering only the significant fields of the data flow control field and the microinstruction memory control field) as:

| LOCATION | $B_1$ | $B_2$ | $AD_s$ | $IB_c$ | $AU_c$ | MACRO CONTROL | MOD | SEQ | JUMP |
|---|---|---|---|---|---|---|---|---|---|
| $(100)_{10}$ | Select Register P | Select Register IA | Select Bus 22 | Store Bus 20 | ADD | TTRS | 01 | $AU_N$ | $(300)_{10}$ |

In response to such microinstruction the contents in registers P and IA become added in the arithmetic unit AU and the result is stored in register IB. Since the MACRO CONTROL field is TTRS, line TTRS is logical 1 and the GENERAL bus will provide the next address for the microinstruction memory 14. The digital word on the GENERAL bus will be either the JUMP field (i.e. $(300)_{10}$) or, because the MOD field is 01, the JUMP + 1 (i.e. $(301)_{10}$, depending on the output of selector 52 (i.e. whether the arithmetic unit AU produces a negative result. Since the SEQ field passes the line $AU_N$ to the line COND (via selector 54), and since line TTRS is logical 1, the output of selector 52 will be logical 1 if line $AU_N$ is logical 1 or such output will be logical 0 if line $AU_N$ is logical 0. That is, if the line $AU_N$ indicates that the arithmetic unit AU is negative (i.e. line $AU_N$ is logical 1), the next address will be location $(300)_{10}$. However, if the arithmetic unit is positive (i.e. line $AU_N$ is logical 0), the next address will be location $(301)_{10}$.

EXAMPLE III

This example illustrates how the digital word on the SPECIAL bus is selected as the next address for the microinstruction memory 14. As described in connection with FIG. 3, the combination logic selector 60 is adapted to couple to the SPECIAL bus a selected one of a plurality of data words, each one comprised of binary signals developed in the digital computer 10, including the JUMP field, or a portion thereof. For example, referring to FIG. 3 and considering the microinstruction at location $(800)_{10}$ to be represented as

| Location | RS$_1$ | RS$_2$ | RS$_3$ | JUMP | MACRO CONTROL | SEQ |
|---|---|---|---|---|---|---|
| (800)$_{10}$ | | | | J$_1$-J$_{10}$ | NOOP | (2)$_{10}$ |

In response to such microinstruction the SEQ field will selectively couple the digital word on input port "2" of selector 64 (FIG. 3) to the SPECIAL bus thereby to produce on such bus the 10 bit digital word J$_1$ . . . J$_8$ IA$_P$ IB$_N$. Because the MACRO CONTROL field is "NOOP" (as described, lines F/F$_s$, TFLS and TTRS are therefore logical 0) and because the SEQ field, when decoded by decoder 46, produces logical 0 signals on lines OP$_s$ and NEXT and selects input port "2" of selector 64, the 10 bit data word J$_1$ . . . J$_8$ IA$_P$ IA$_N$ becomes coupled to bus 38 to provide the next address for the microinstruction memory 14. Further, as discussed, such digital word will provide one of four possible addresses, depending on the condition of the registers IA$_P$ and IA$_N$, such address therefore being either:

J$_1$ . . . J$_8$ 00
J$_1$ . . . J$_8$ 01
J$_1$ . . . J$_8$ 10
J$_1$ . . . J$_8$ 11

EXAMPLE IV

In this example the microinstruction at location (100)$_{10}$ of a "basic" routine calls for a first subroutine beginning at location (200)$_{10}$. This first subroutine in turn calls for a second subroutine beginning at location (300)$_{10}$. A microinstruction in the second subroutine, say for example the microinstruction at location (300)$_{10}$, states that if a specified condition is true go to a third subroutine beginning at location (400)$_{10}$, but if such condition is not true go to the next sequential location in the next microinstruction in the basic routine (i.e. location (101)$_{10}$. Further, one of the microinstructions in the third subroutine, say at location (405)$_{10}$, returns the microinstruction memory to the next sequential address in the second subroutine (i.e. location (201)$_{10}$. Still further, a microinstruction in the first subroutine, say at location (206)$_{10}$, returns the microinstruction memory to the next microinstruction in the basic routine (i.e. location (101)$_{10}$). In order to execute the above, the following microinstructions are used:

| Location | MACRO CONTROL | MOD | SEQ | JUMP | RS$_1$ | RS$_2$ |
|---|---|---|---|---|---|---|
| (100)$_{10}$ | NOOP | X | Uncond Transfer | (200)$_{10}$ | 1 | |
| — | | | | | | |
| — | | | | | | |
| — | | | | | | |
| — | | | | | | |

| Location | MACRO CONTROL | MOD | SEQ | JUMP | RS$_1$ | RS$_2$ |
|---|---|---|---|---|---|---|
| (199)$_{10}$ | | | | | | |
| — | | | | | | |
| — | | | Uncon Transfer | | | |
| (200)$_{10}$ (201)$_{10}$ | NOOP | X | | (300)$_{10}$ | 1 | |
| — | | | | | | |
| (206)$_{10}$ | TTRS | 10 | Z | X | | |
| — | | | | | | |

| Location | MACRO CONTROL | MOD | SEQ | JUMP | RS$_1$ | RS$_2$ |
|---|---|---|---|---|---|---|
| (300)$_{10}$ | TTRS | 10 | P$_N$ | (400)$_{10}$ | | |
| — | | | | | | |
| — | | | | | | |
| (400)$_{10}$ (405)$_{10}$ | TTRS | 11 | Z | X | | |

The microinstruction at location (100)$_{10}$ (i.e. a microinstruction in the "basic" routine) states that, because the MACRO CONTROL is "NOOP" (i.e. lines F/F$_s$, TTRS, TFLS are logical 0) and SEQ is "unconditional transfer" (i.e. lines OP$_s$ and NEXT are also logical 0) the JUMP field (i.e. (200)$_{10}$) is the next microinstruction memory address. Also, register REG. 1 will store location (101)$_{10}$ because of the logical 1 on line RS$_1$.

The microinstruction at location (200)$_{10}$ states that, for reasons discussed in connection with the microinstruction at location (100)$_{10}$, the next address is at location (300)$_{10}$ (i.e. the second subroutine) and register REG. 2 will store the next microinstruction in this subroutine, i.e. location (201)$_{10}$.

The microinstruction at location (300)$_{10}$ states that if the contents of register P are negative (i.e. line P$_N$ is a logical 1) jump to location (400)$_{10}$ (i.e. the third subroutine) but if the contents of register P are not negative go to the address stored in REG. 1 (i.e. (101)$_{10}$.

The microinstructions at location (400)$_{10}$, here say call for sequential addressing. Therefore, when the microinstruction at location (405)$_{10}$ is executed, because the SEQ field selects Z, a logical 0 from selector 55 and logical 1 on line TTRS couples such logical 0 to selector 52, the contents of register REG. 2 are coupled to bus 38 because of the 11 in the MOD field. Therefore, the next microinstruction is at the location stored in REG. 2 (i.e. location (201)$_{10}$. The microinstruction beginning at location (201)$_{10}$ here say call for sequential addressing. Therefore, when the microinstruction at location (206)$_{10}$ is executed, because the SEQ field selects line Z, a logical 0, from selector 55 and the logical 1 on line TTRS couples such logical 0 to selector 52, the contents of register REG. 1 are coupled to bus 38 because of the 10 in the MOD field.

EXAMPLE V

In this example the microinstruction at say, location (100)$_{10}$, states that if a condition is true go to a location specified in the JUMP field and if such condition is not true go to the next sequential address (i.e. location (101)$_{10}$). Further, the microinstruction at location (200)$_{10}$ states that if the same condition is false do the same thing as stated above, that is, go to location specified in the JUMP field, but if such condition is not false go to the next sequential microinstruction, (i.e. location (201)$_{10}$). This example may be represented by the following microinstruction:

| Location | MACRO CONTROL | MOD | SEQ | JUMP |
|---|---|---|---|---|
| (100)$_{10}$ | TTRS | 0 | IA$_Z$ | (300)$_{10}$ |
| (200)$_{10}$ | TFLS | 0 | IA$_Z$ | (300)$_{10}$ |

Here the condition is whether the contents of register IA are zero.

Having described a preferred embodiment of the invention, it is now evident that other embodiments incorporating its concepts may be used. For example, the two input bus-two output bus data flow unit 16 may be replaced with a single input bus-single output bus data flow unit as described in a copending patent application filed Apr. 21, 1975, Ser. No. 570,114, entitled "Digital Processor," inventor John Terzian, assigned to the same assignee as the present invention. Further, each one of the signals comprising the SPECIAL digital word may be a logical combination of other signals available in the computer. Also, the JUMP field may be incremented by a number other than +1 to provide a second, conditional, address. Still further, the registers REG. 1, REG. 2, REG. 3 may each be a stack. It is felt, therefore, that this invention should not be restricted to its disclosed embodiment but rather should be limited only by the spirit and scope of the appended claims.

What is claimed is:

1. A digital computer wherein a microinstruction memory stores an addressable fetch microprogram and independent sets of addressable microinstructions, each set of microinstructions including a last microinstruction for calling the fetch microprogram, and each one of the stored microinstructions in the sets thereof has an addressing control field, a microinstruction memory addressing control unit, comprising:
   a. a first storage means for storing the beginning address of the fetch microprogram;
   b. second storage means, responsive to a microinstruction in a first set of microinstructions under execution, for storing the address of a different microinstruction in such first set of microinstructions;
   c. means for producing a control signal in accordance with a first portion of the addressing control field of one of the microinstructions in the first set of microinstructions; and
   d. selector means, responsive to the control signal and a second portion of the addressing control field of the last microinstruction in a second one of the sets of microinstructions under execution, for coupling to the microinstruction memory as the next address for such memory either the beginning address of the fetch microprogram stored in the first storage means or the address of the different microinstruction in the first set of microinstructions stored in the second storage means.

2. The computer recited in claim 1 wherein the selector means includes an output selector comprising: a first input coupled to a third portion of the addressing control field of one of the microinstructions in the second set of microinstructions under execution; a second input terminal coupled to either the first or second storage means selectively in accordance with the control signal; and an output terminal coupled to the microinstruction memory, such output selector coupling to such output terminal either the first input terminal or the second input terminal selectively in accordance with the second portion of the addressing control field of the microinstruction in the second set of microinstructions under execution, such output terminal feeding to such microinstruction memory the next address for such memory.

3. A digital computer wherein a microinstruction memory stores sets of addressable microinstructions and wherein each one of such stored microinstructions has a microinstruction memory addressing control field, a microinstruction memory addressing control unit comprising:
   a. means for producing a plurality of condition signals;
   b. condition selector means, responsive to a first portion of the addressing control field of one of the microinstructions in a first set of microinstructions under execution, for selecting one of the plurality of condition signals;
   c. storage means for storing, in response to one of the microinstructions in a second set of microinstructions under execution, the address of the microinstruction under execution displaced by a predetermined number; and
   d. selector means, responsive to the selected condition signal produced in response to execution of the microinstruction in the first set thereof, for coupling to the microinstruction memory as the next address for such memory either the address stored in the storage means or a second portion of the addressing control field of the microinstruction in the first set of microinstructions under execution.

4. A digital computer wherein a microinstruction memory stores sets of addressable microinstructions and wherein each one of such stored microinstructions has a microinstruction memory addressing control field, and a microinstruction memory addressing control unit comprising:
   a. means for producing a plurality of condition signals;
   b. condition selector means, responsive to a first portion of the addressing control field of a microinstruction under execution, for selecting one of the plurality of condition signals;
   c. displacing means, coupled to a second portion of the addressing control field of the same microinstruction under execution, for displacing such second portion a predetermined number;
   d. selector means, responsive to the selected condition signal, for coupling to the microinstruction memory as the next address for such memory either the second portion of the addressing control field of the same microinstruction under execution or the displaced second portion of the addressing control field.

5. A digital computer wherein a microinstruction memory stores addressable microinstructions and wherein each one of such stored microinstructions has a microinstruction memory addressing control field and a microinstruction memory addressing control unit comprising:
   a. means for producing a plurality of condition signals;
   b. condition selector means, responsive to a first portion of the addressing control field of a first microinstruction under execution, for selecting one of the plurality of condition signals;
   c. storage means for storing, in response to a second microinstruction under execution, the address of the second microinstruction under execution displaced by a predetermined number;
   d. first selector means, responsive to a second portion of the addressing control field of the first microinstruction under execution, for coupling to the output terminal of such first selector means either the storage means or a third portion of the addressing control field of the first microinstruction under execution displaced by a predetermined number; and e. output selector means, responsive to the selected condition signal, for coupling to the microinstruction memory as the next address for such memory either the output terminal of the first selector means or the second portion of the addressing control field of the first microinstruction under execution.

6. The computer recited in claim 5 including an additional storage means coupled to a third input terminal of the first selector means, for storing, in response to a third microinstruction under execution, the address of such third microinstruction under execution displaced by a predetermined number.

* * * * *